(12) United States Patent
Werjefelt et al.

(10) Patent No.: US 8,453,969 B2
(45) Date of Patent: Jun. 4, 2013

(54) GLARE SHIELD EQUIPPED WITH AN EMERGENCY VISION APPARATUS

(76) Inventors: Bertil R. L. Werjefelt, Kaneohe, HI (US); Alexander K. Werjefelt, Kaneohe, HI (US); Christian Werjefelt, Kaneohe, HI (US)

( * ) Notice: Subject to any disclaimer, the term of this patent is extended or adjusted under 35 U.S.C. 154(b) by 222 days.

(21) Appl. No.: 13/166,419

(22) Filed: Jun. 22, 2011

(65) Prior Publication Data

US 2012/0325961 A1    Dec. 27, 2012

(51) Int. Cl.
*B64D 11/00*    (2006.01)
(52) U.S. Cl.
USPC ..................... 244/118.5; 280/728.1
(58) Field of Classification Search
USPC ................ 244/118.5, 122 AG, 121; 359/894; 280/728.1, 728.2
See application file for complete search history.

(56) References Cited

U.S. PATENT DOCUMENTS

| | | | |
|---|---|---|---|
| 4,832,287 A * | 5/1989 | Werjefelt | ................. 244/118.5 |
| 5,202,796 A | 4/1993 | Werjefelt | |
| 5,318,250 A | 6/1994 | Werjefelt | |
| 5,558,300 A * | 9/1996 | Kalberer et al. | .............. 244/121 |
| 5,947,415 A * | 9/1999 | Werjefelt | ................... 244/118.5 |
| 6,082,673 A | 7/2000 | Werjefelt | |
| 6,460,804 B2 | 10/2002 | Werjefelt | |
| 7,583,455 B2 | 9/2009 | Werjefelt | |
| 8,342,571 B2 * | 1/2013 | Baumgartner et al. | ....... 280/740 |
| 2006/0145003 A1 * | 7/2006 | Bardel et al. | ............... 244/118.5 |
| 2009/0279196 A1 | 11/2009 | Werjefelt | |
| 2011/0019297 A1 | 1/2011 | Werjefelt | |

* cited by examiner

*Primary Examiner* — Timothy D Collins
*Assistant Examiner* — Brian M O'Hara
(74) *Attorney, Agent, or Firm* — Shlesinger, Arkwright & Garvey LLP

(57) ABSTRACT

A glare shield equipped with an emergency vision apparatus comprises a glare shield in a cockpit and a compartment recessed into the glare shield. A blower is disposed within the compartment. An inflatable first enclosure made of airtight material and having an expanded form when deployed and a deflated form when not in use is connected to the blower with a tubular air passageway. The first enclosure when in the deflated form is stored within the compartment. First and second clear members are disposed at respective first and second ends of the enclosure to enable a user to see through the first enclosure when expanded and observe a source of information at a distal end of the first enclosure while smoke or other particulate matter is in the environment. A switch operably is associated with the blower to activate the blower and thereby inflate the first enclosure when deployed.

19 Claims, 8 Drawing Sheets

FIG. 1
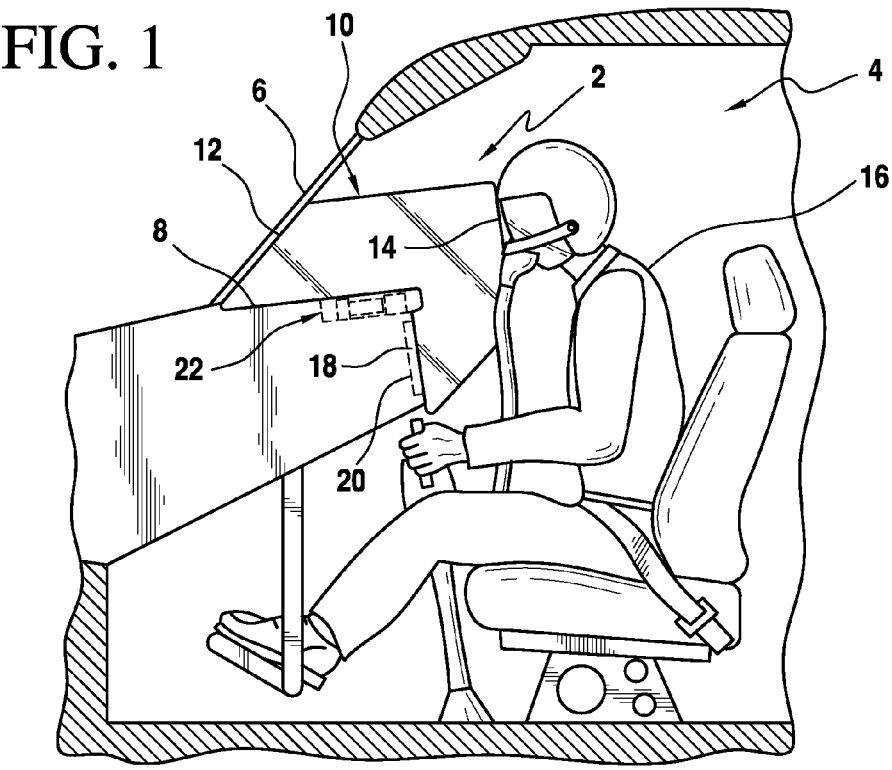
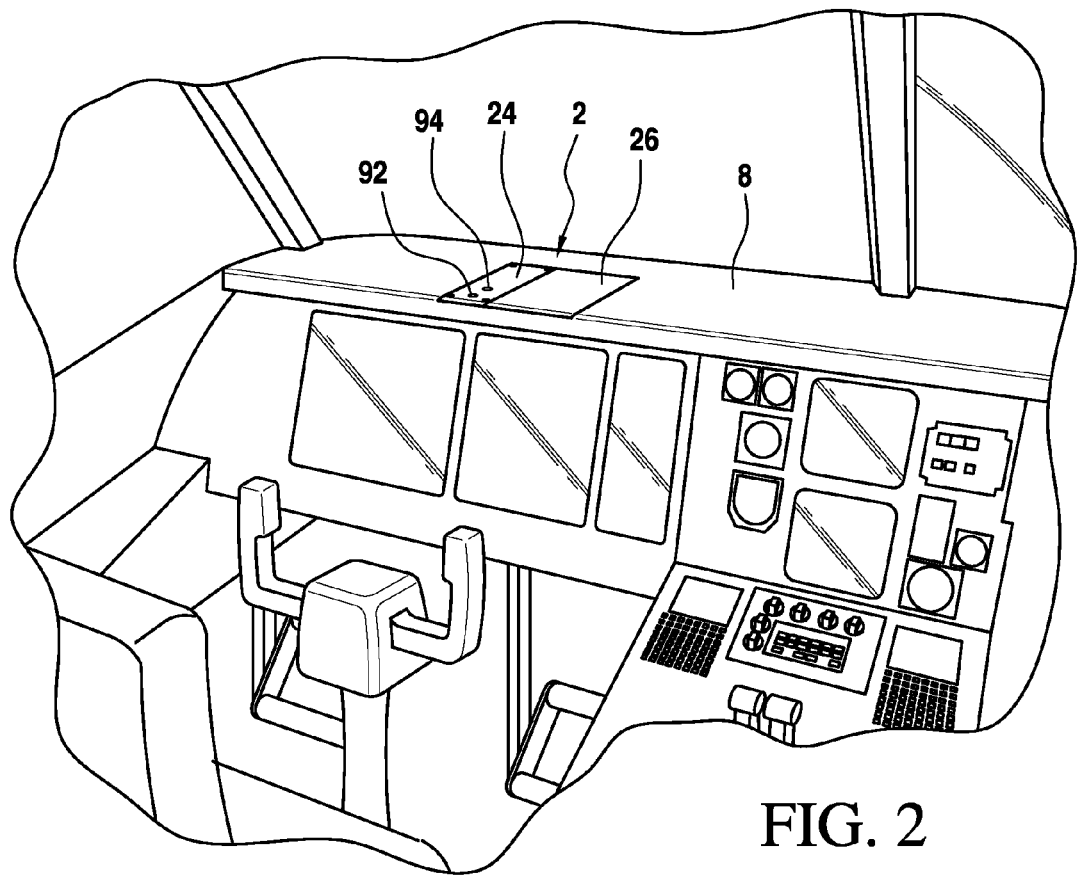
FIG. 2

GLARE SHIELD EQUIPPED WITH AN EMERGENCY VISION APPARATUS

FIELD OF THE INVENTION

The present invention relates generally to an apparatus to enable an operator to maintain visual contact with instruments or other visual sources of data after smoke and/or particulate from a fire or other sources has invaded the operator's environment. In particular, the present invention relates to an emergency vision apparatus that uses an inflatable enclosure that bridges the gap between a pilot and the windshield and/or instrument panel of an aircraft along the pilot's line of sight and provides a clear viewing path to the windshield and/or the instrument panel, thereby providing the operator with vital information for guiding the aircraft to a safe landing after smoke and/or particulate matter invades the cockpit area.

BACKGROUND OF THE INVENTION

Emergency vision devices for aiding pilots to see through vision-impairing smoke to maintain their visual access to critical information, such as that provided by an instrument panel and visual information available outside the cockpit to help pilots safely guide their aircrafts are disclosed in U.S. Pat. Nos. 4,832,287; 5,318,250; 5,202,796; 5,947,415, 6,460, 804 and 7,583,455 all issued to Bertil Werjefelt.

SUMMARY OF THE INVENTION

The present invention provides a glare shield equipped with an emergency vision apparatus, comprising a glare shield in a cockpit and a compartment recessed into the glare shield. A blower is disposed within the compartment. An inflatable first enclosure made of airtight material and having an expanded form when deployed and a deflated form when not in use is connected to the blower with a tubular air passageway. The first enclosure when in the deflated form is stored within the compartment. First and second clear members are disposed at respective first and second ends of the enclosure to enable a user to see through the first enclosure when expanded and observe a source of information at a distal end of the first enclosure while smoke or other particulate matter is in the environment. A switch operably is associated with the blower to activate the blower and thereby inflate the first enclosure when deployed.

BRIEF DESCRIPTION OF THE DRAWINGS

FIG. 1 is a schematic side elevational view of a cockpit, showing the apparatus embodying the present invention in a deployed position.

FIG. 2 is a perspective view of a cockpit, showing the access covers for the compartment disposed within the glare shield that houses the blower and associated components and the inflatable enclosure.

DETAILED DESCRIPTION OF THE INVENTION

Figure 3:
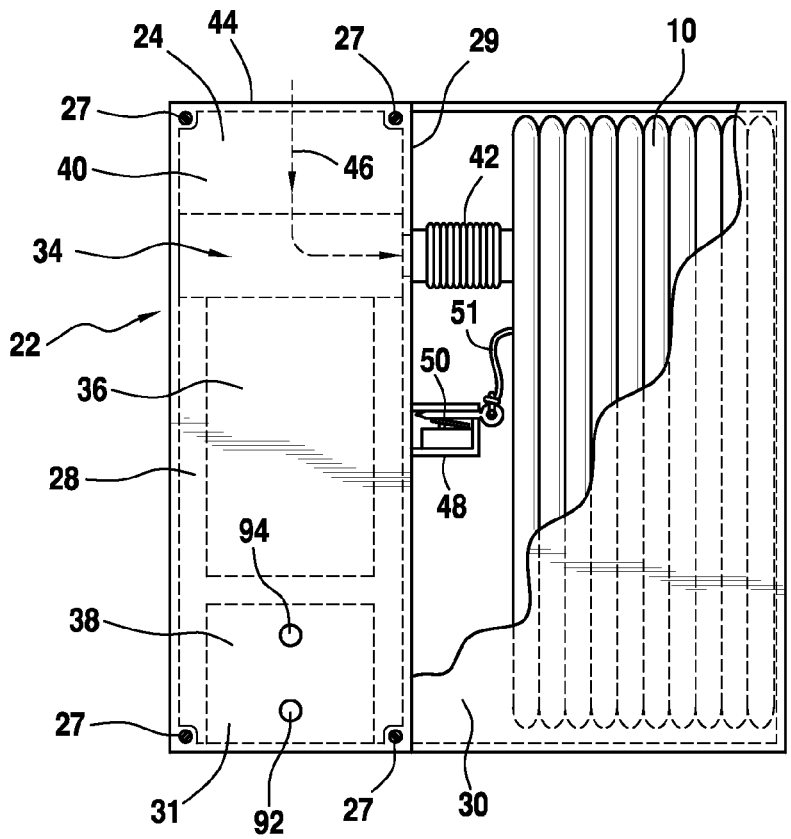
FIG. 3 is a plan view of the apparatus, with portions shown broken away, showing the inflatable enclosure in the deflated state and a switch operably associated with the inflatable enclosure.

An instrument panel integrated emergency vision apparatus 2 embodying the present invention is disclosed in FIG. 1. The apparatus 2 is used in an operator station 4, such as an aircraft cockpit, during a smoke emergency to allow the user to see through the smoke to a source of information, such as flight instruments. In the environment of an aircraft cockpit, the operator station 4 includes a windshield 6 and a glare shield 8. The apparatus 2 includes an inflatable enclosure 10 having a transparent, clear member 12 and another transparent, clear member 14 that allow the user 16 to see through the enclosure 10 and out through the windshield 6 during a smoke emergency situation. This advantageously helps the user in trying to control the aircraft and bring it to a safe landing. The enclosure 10 also includes another transparent, clear member 18 to allow the user to observe information on an instrument panel 20. The apparatus 2 includes a compartment 22 disposed within the glare shield 8. The placement of the compartment 22 near where the enclosure 10 will be deployed and positioned advantageously provides for a space saving arrangement as will become apparent later on. The enclosure 10 includes a relief valve (not shown) to keep the enclosure from over-inflating, as is known in the prior art.

The enclosure 10 may made in any shape as long as there is a clear line of sight between the clear members 12 and 14, and between the clear members 18 and 14. Preferably, the clear member 12 will be oriented and shaped to provide close contact with the windshield 6 so as to displace vision-obscuring smoke in the space in between. Similarly, the clear member 18 will be oriented in close contact with the face of the instrument panel 20. The clear members 12, 14 and 18 are pliable enough to conform to and seal over irregularities on the surfaces which they contact to displace any smoke on such surfaces.

The enclosure 10 is made of airtight fabric or other pliable and foldable material, such as plastic sheet. The transparent, clear members 12, 14 and 18 may be made of foldable sheet plastic.

Referring to FIG. 2, the apparatus 2 is shown recessed into the glare shield 8. Visible outside the glare shield 8 are access covers 24 and 26. The access cover 26 is readily removable without use of any tool. The access cover 26 may be secured in place by standard means, such magnetic holders that provide enough holding power during takeoff and landing but allows the cover to be readily and quickly removed by the user during a smoke emergency for deployment of the apparatus 2. The access covers 24 and 26 are preferably flush with the outside surface of the glare shield 8.

In the general environment of an operator station, the compartment 22 may be installed as part of the instrument panel and located near the instruments whose source of information is critical for the operator to view during a smoke or vision-obscuring emergency. The compartment 22 is preferably installed recessed into instrument panel, with the access covers 24 and 26 flush with the instrument panel or protruding above the panel surface. The compartment 22 may also be surface mounted.

Referring to FIG. 3, the access cover 24 may be secured in place by screws 27 or some other standard means. The compartment 22 is partitioned with a divider wall 29 into a section 28 that houses a blower 34 driven by a motor 36 powered by a bank of batteries 38 and a section 30 that houses the enclosure 10. A filter cartridge 40 filters the ambient air of particulate matter before it is pumped to the enclosure 10 through a flexible hose 42. Air will be drawn into the enclosure 10 through a perforated wall portion 44 of the compartment 22 in a direction generally shown by the arrow 46. The access cover 24 is used to gain access to the various components inside the section 28 for maintenance purposes.

It will be seen that locating the apparatus 2 in the glare shield 8 advantageously allows a shorter length of hose 42 between the blower 34 and the enclosure 10 since the apparatus 2 is positioned as close to where the enclosure 10 will be deployed. This then reduces the amount of space required for storing the apparatus 2. The compartment 22 is smaller, requiring less space, because there is less hose to store and consequently less weight, which is an important consideration in an aircraft.

A switch 48 is operably associated with a removable member 50 that keeps the switch in an open state while the member 50 is normally disposed within the switch housing. When the member 50 is removed, the switch 48 is automatically changed to a closed state to activate the motor 36 that turns the blower 34. The member 50 is attached to the enclosure 10 by standard means, such as by a line 51 such that when the enclosure 10 is removed from the compartment, the removable member 50 is also removed without further action from the user other than the act of removing the enclosure 10 from the compartment 22, thereby automatically activating the switch 48. The enclosure 10 is shown in a deflated state while in storage in the compartment 22.

The hose 42 is flexible and extendable so that when the enclosure 10 is taken out of the compartment 22 for deployment, the hose 42 will extend to the desired length. For storage, the hose 42 is contracted to a compact length to save space in the compartment 22. The hose 42 may be made from a spiral spring wrapped with airtight fabric material that may be compressed to a shorter length for storage or allowed to expand to a longer length for deployment. The hose 42 may also be made from plastic material where the wall of the hose is pleated or folded accordion style so that the hose can be stretched to a longer length during use or compressed to a shorter length for storage. Other extendable hose construction is within the skill of a person skilled in the art.

Figure 4:
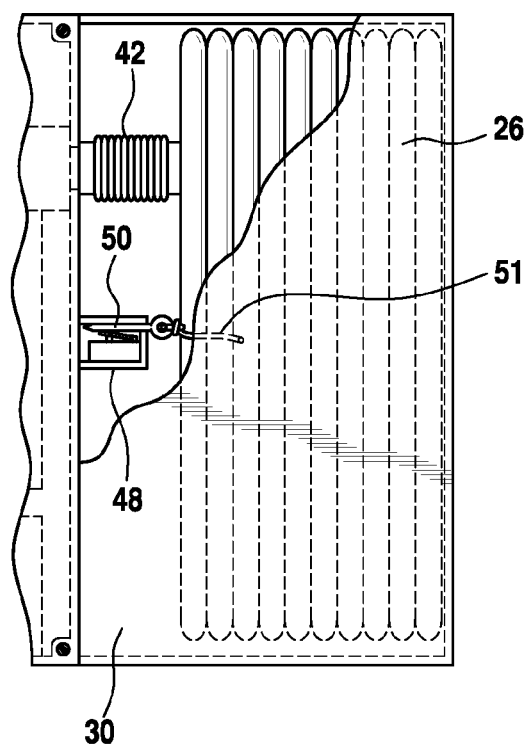
FIG. 4 is similar to FIG. 3, with the exception of the removable member that operates the switch being attached to an access cover of a section of the compartment that houses the inflatable enclosure.

Referring to FIG. 4, the removable member 50 is shown attached to the cover 26 so that when the cover 26 is removed, the removable member 50 is also removed, thereby automatically activating the switch 48. Standard means, such as a line 51, is tied to the member 50 and the to the cover 26.

Figure 5:
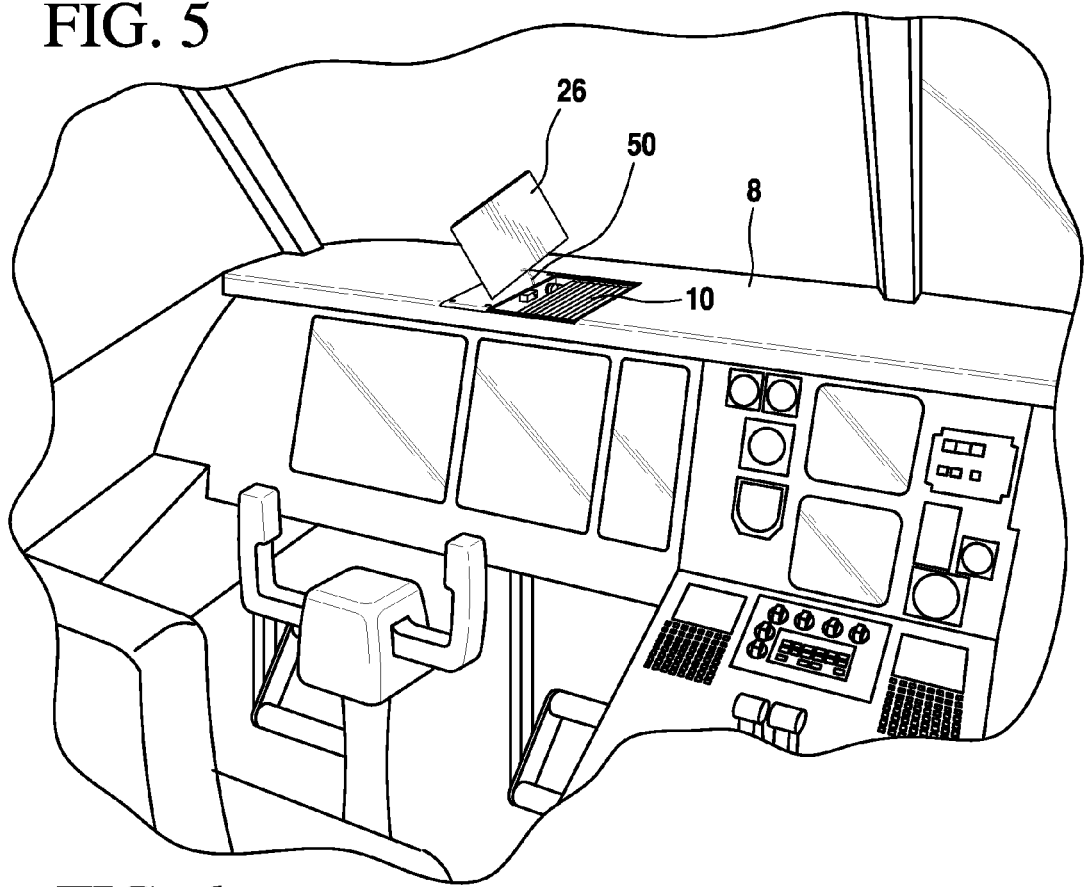
FIG. 5 is a perspective view of the cockpit, showing the access cover over the deflated inflatable enclosure being removed.
Figure 6:
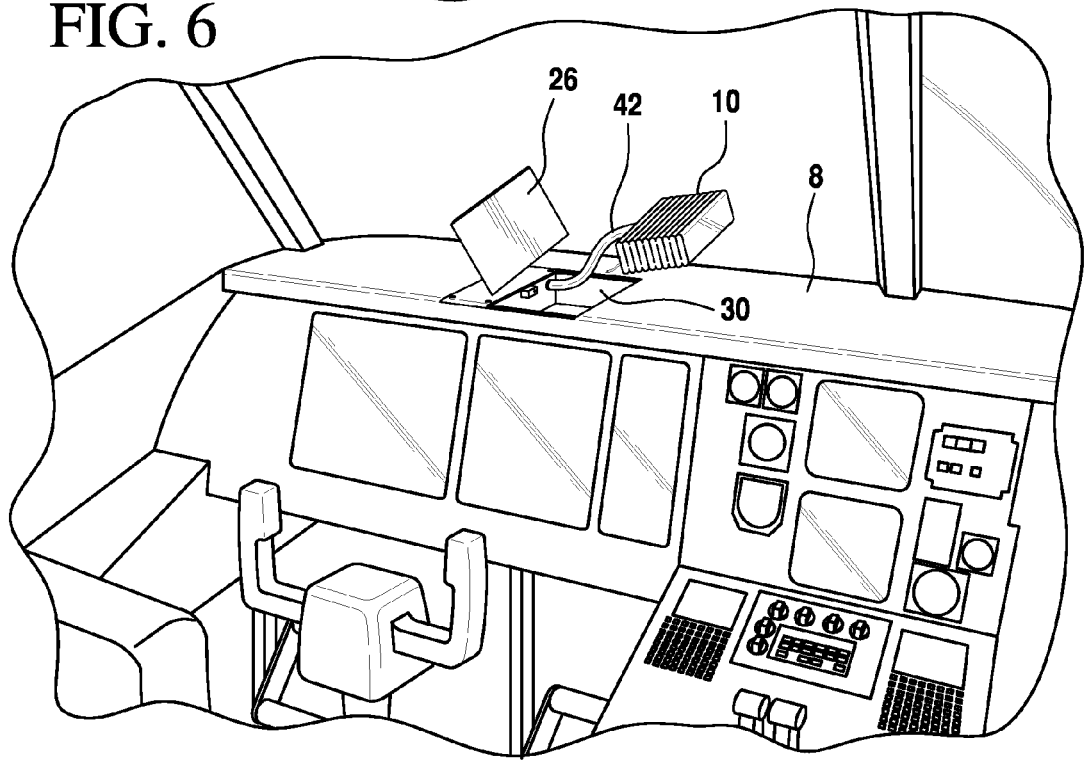
FIG. 6 is similar to FIG. 5, showing the inflatable enclosure being removed from compartment.

Referring to FIG. 5, the removable access cover 26 is shown in the process of being removed. The removable member 50 is shown attached to the cover 26. The hose 42 is extended as the enclosure 10 is taken from inside the compartment section 30, as shown in FIG. 6.

Figure 7:
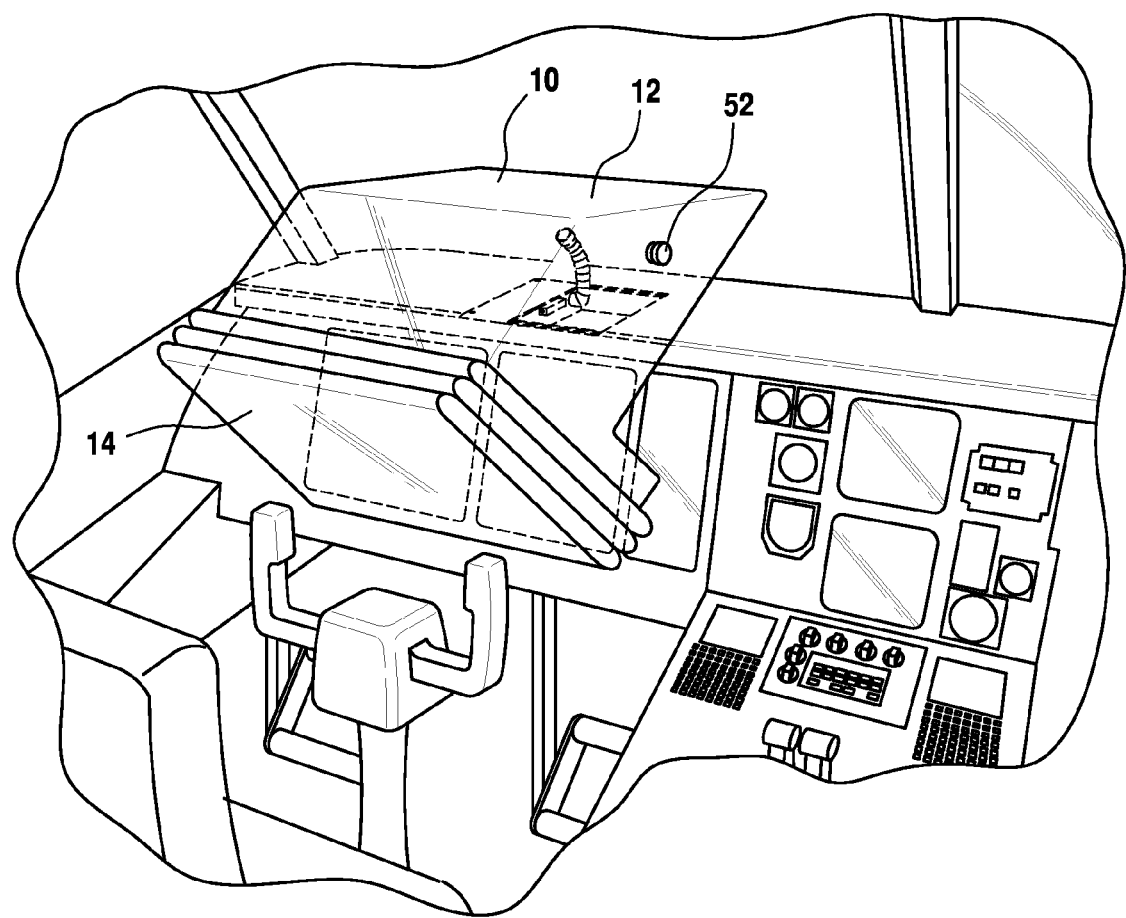
FIG. 7 shows the inflatable enclosure partly inflated.

Referring to FIG. 7, the inflatable enclosure 10 is shown in the process of being inflated by the blower 34. The clear member 12 is visible in this figure. The enclosure 10 is advantageously positioned near or over the compartment 10 to minimize the length of the hose 42, since less hose means less storage space and less weight.

Figure 8:
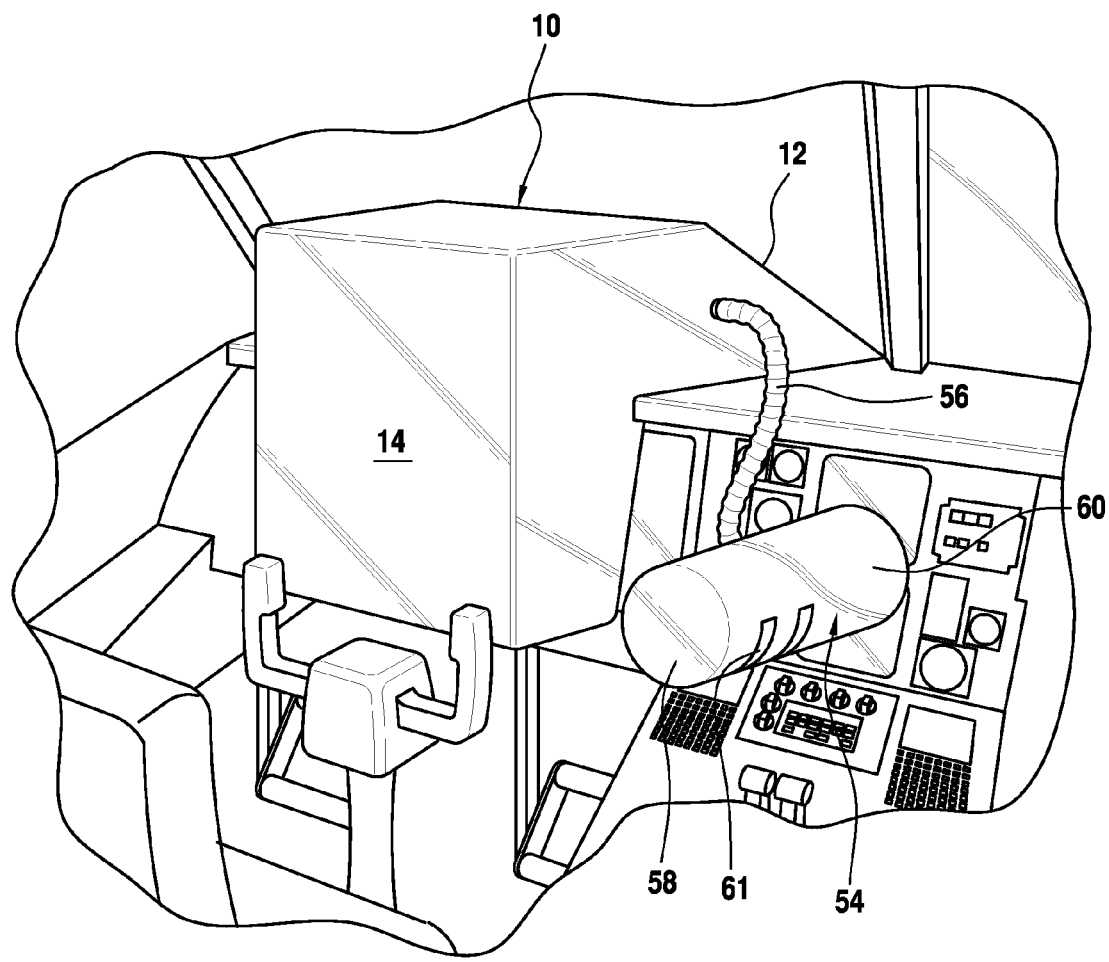
FIG. 8 is a perspective view of the cockpit showing the inflatable enclosure fully inflated and also showing a hand-held unit connected to the inflatable enclosure by a hose.

The enclosure 10 is provided with a hose connector 52 with a removable cap that can be used to connect an auxiliary portable handheld enclosure 54 using a hose 56, as shown in FIG. 8. The handheld enclosure 54 also includes clear members 58 and 60 to allow the user to point it towards a portion of the instrument panel within reach of the hose 56 and allows the user to see the information through the clear members 58 and 60 in the presence of smoke in the cockpit. Handle straps 61 affords the user to slip the user's arm through one strap and to grab the other strap with the user's hand, thereby allowing the user to point and position the handheld enclosure 54 as desired, for example, toward a flight management system display on the console or an electronic flight bag. The handheld enclosure 54 is made of airtight fabric material or other pliable and foldable plastic sheet material.

Figure 9:
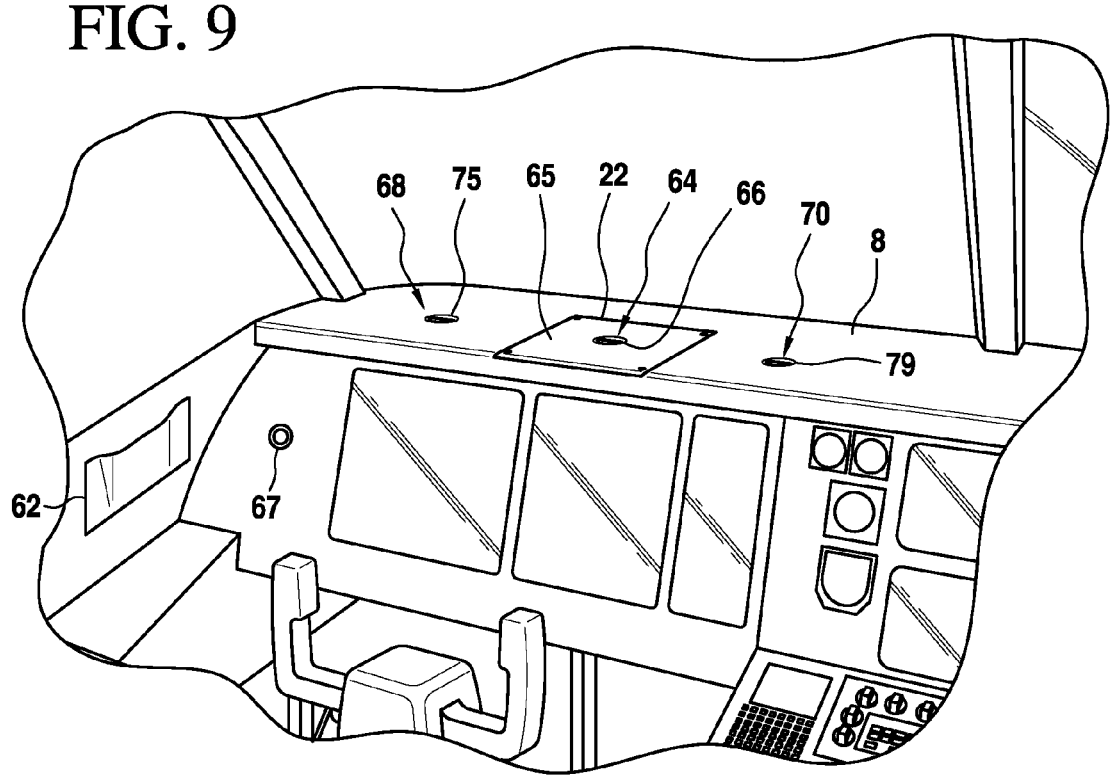
FIG. 9 is a perspective view of the cockpit showing another embodiment of the present invention.
Figure 10:
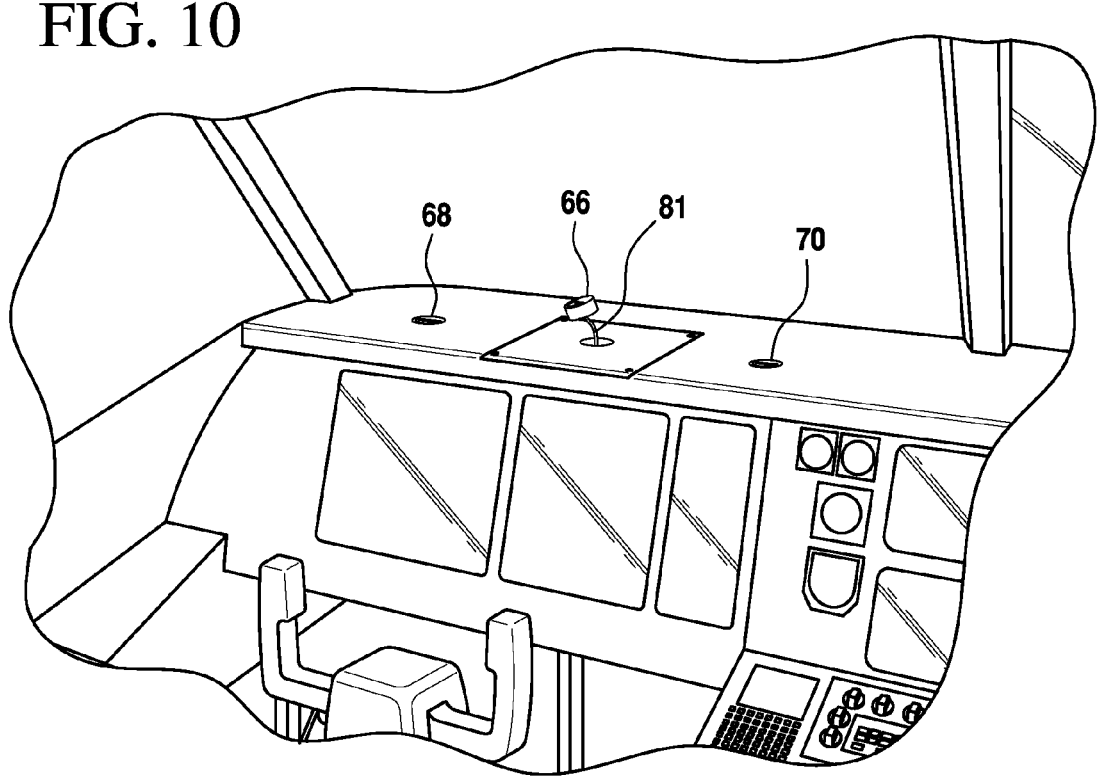
FIG. 10 is similar to FIG. 9, showing a removable cap in the process of being removed from an air outlet.

Referring to FIGS. 9 and 10, another embodiment of the present invention is disclosed wherein the inflatable enclosure 10 is stored separate from the compartment 22 in a pouch 62 disposed within convenient reach of the user. In this embodiment, the compartment 22 only houses the blower 34, motor 36, batteries 38 and filter cartridge 40, providing a reduction in space required for the installation of the apparatus in the glare shield. The hose 42 is terminated into an outlet 64 instead of being connected to the enclosure 10. The outlet 64 is accessible outside the compartment 30. The outlet 64 includes a removable cap 66 connected to the removable member 50 with a line 81 such that when the cap 66 is removed, the removable member 50 is also removed from the switch 48, thereby activating the blower 34. If desired, additional outlets 68 and 70 remote from the compartment may be provided with respective removable caps operably associated with the removable member 50. The outlets 68 and 70 may be used for inflating a handheld auxiliary inflatable enclosure, such as the enclosure 60 (see FIG. 8). removal of any one of the caps is effective to turn the switch 50 to the ON state position, thereby to activate the blower 34. Although the outlets are shown terminating on the glare shield surface, they may be terminated elsewhere, such as the outlet 67, which is terminated on the instrument panel wall. An access cover 65 is provided for maintenance purposes.

The embodiment shown in FIG. 9 is advantageous when space within the glare shield is limited. By storing the enclosure 10 separately from the compartment 22, such as in the pouch 62, the size of the compartment 22 is thereby reduced.

Figure 11:
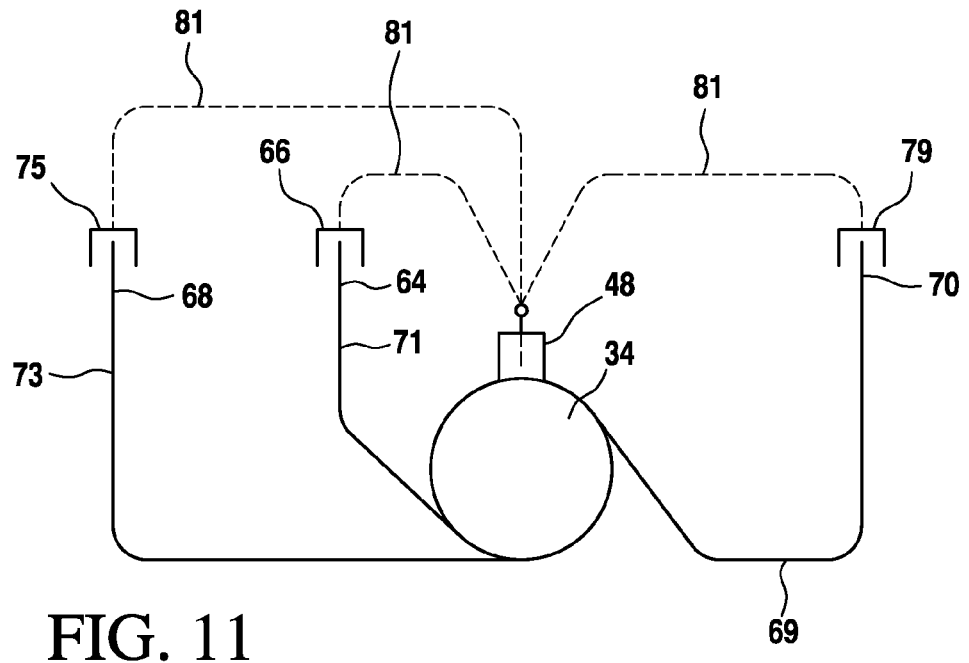
FIG. 11 is schematic diagram of a blower with three hoses capped with removable caps operably associated with a switch that activates the blower.

Referring to FIG. 11, the blower 34 is operably attached to flexible hoses 69, 71 and 73. The outlets 64, 68 and 70 are provided with respective removable caps 75, 66 and 79. Each of the caps may be associated with removable member 50, such as with a respective line 81 attached to the member 50, so that when one of the caps is removed, the line 81 tied to the cap and the member 50 is effective to remove the member 50, thereby energizing the blower 34.

Figure 12:
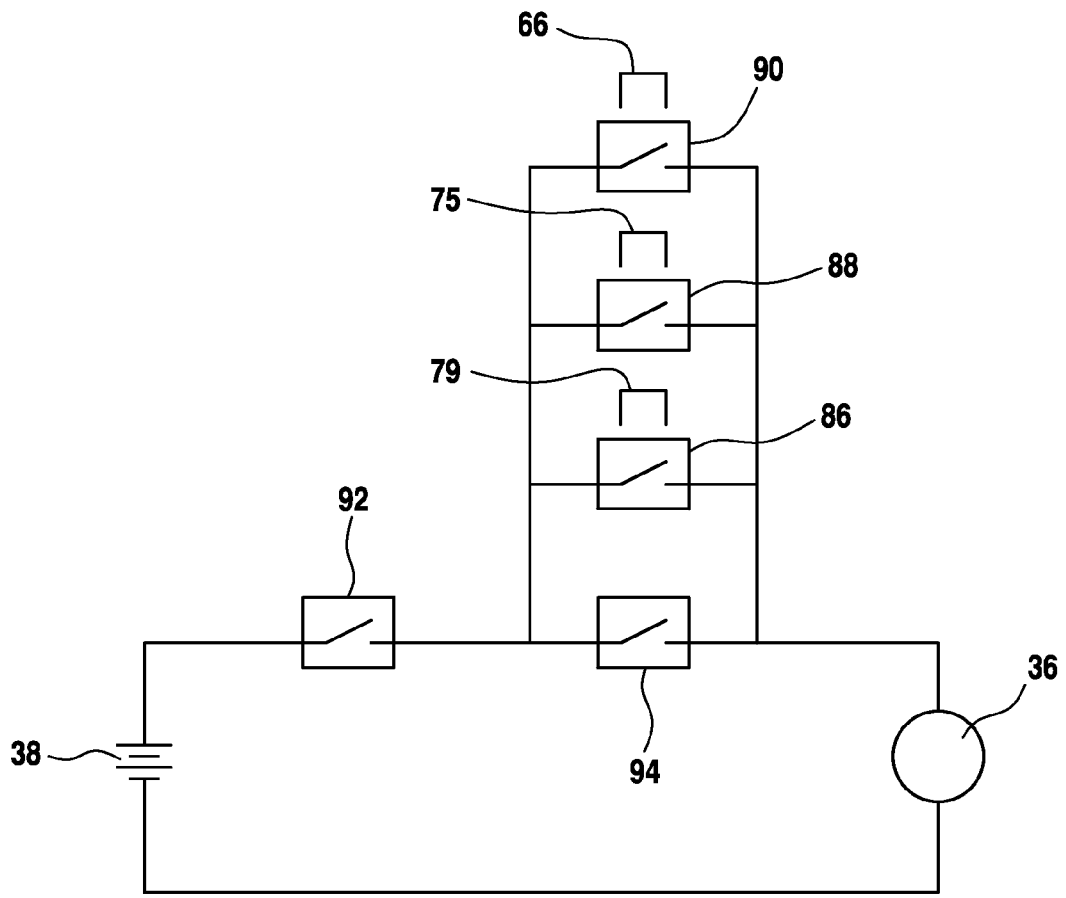
FIG. 12 is a schematic wiring diagram showing three switches in parallel, each one being operably associated with a respective cap, removal of which is effective to turn the associated switch to the ON state.

Referring to FIG. 12, the switch 48 may also be replaced with individual switches 86, 88 and 90 disposed in proximity of the respective caps 79, 75 and 66 whereby removal of any cap is effective to turn the associated switch to the on state, for example using proximity switches. A master switch 92, which is normally closed, may be used to turn off the blower motor 36 when the need for the apparatus 2 has ended after an emergency that required its deployment. A bypass switch 94, which is normally off, may also be used in the event any one of the switches 86, 88 and 90 becomes defective. Turning the switch 94 to on will activate the blower motor 36. The switches 92 and 94 may be toggle or push button switches, accessible outside the compartment 22, as schematically shown in FIGS. 2 and 3.

Other means for activating the blower motor 36, in lieu of the switch 48 with the removable member 50, or the switches 86, 88 and 90 are within the skill of a person skilled in the art.

Referring back to FIG. 9, the caps 66, 75 and 79 are shown flush with the top surface of the glare shield 8.

Figure 13:
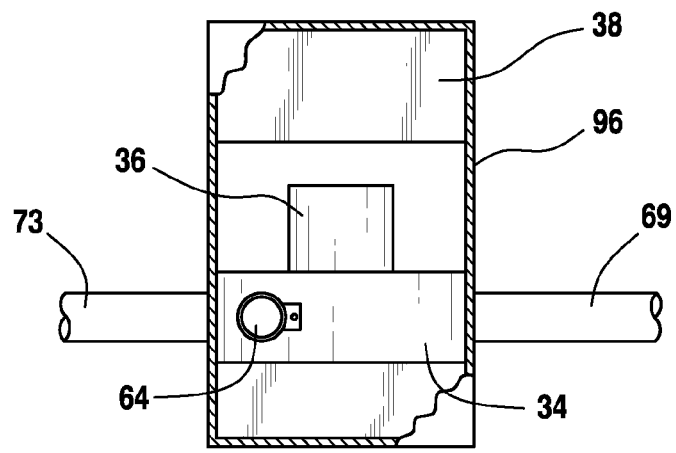
FIG. 13 is a schematic plan view of the compartment, with portions shown broken away, showing the reduced space requirement by having the inflatable enclosure stored elsewhere.

Referring to FIG. 13, a schematic top plan view of a reduced compartment 96 is shown. The compartment 96 houses the blower 34, the motor 36 and the batteries 38. As can be seen, the compartment 36 is reduced in size, since the section 30 that houses the inflatable enclosure 10 is eliminated. The hoses 69 and 73 may be eliminated if necessary due to space constraints, since they are used to inflate auxiliary enclosures only.

Figure 14:
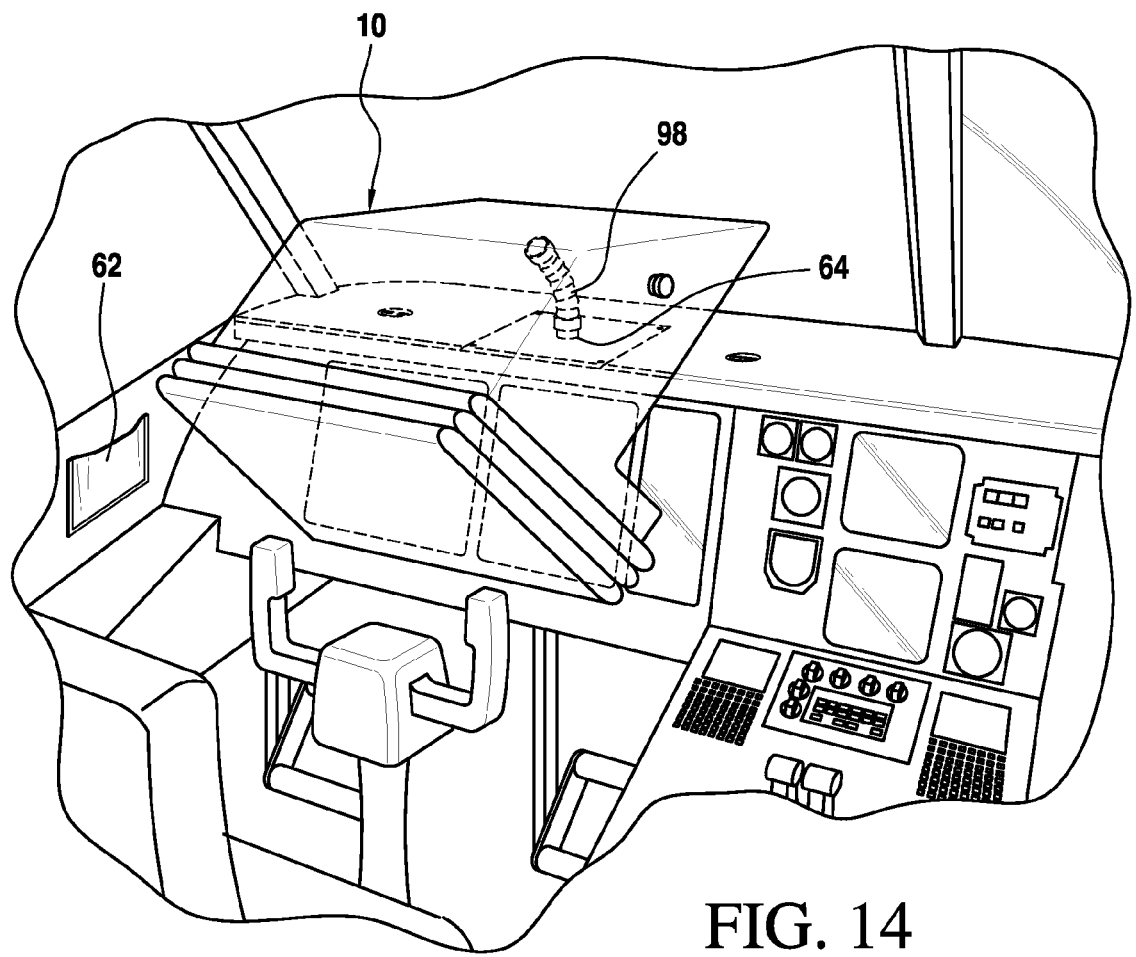
FIG. 14 is a perspective view of the cockpit showing the enclosure partially inflated with air supplied from an outlet shown in FIG. 9.

Referring to FIG. 14, the enclosure 10 is shown removed from the pouch 62. A flexible hose 98 already connected to the enclosure 10 is attached to the outlet 64 after the cap 66 is removed. The removal of the cap 66 triggers the switch 48 by removal of the member 50 through the line 81 attached to the cap 66. As disclosed above, other means for activating the blower motor 36 may be employed.

It is seen from the foregoing description that the apparatus 2 enables an operator to maintain visual contact with instruments or other visual sources of data after vision-obscuring matter, such as smoke and/or particulate matter from a fire, has invaded the operator's environment. In particular, the apparatus 2 provides a clear view outside the windshield and of the instrument panel in an aircraft cockpit, thereby providing the pilot with vital information for guiding the aircraft to a safe landing after such as smoke or other vision-obscuring matter, invades the cockpit area.

Although the apparatus 2 is shown in the context of an aircraft cockpit, the invention can be used in other similar environments where an operator in a station requires access to information from a source, such as an instrument panel, during a vision-obscuring emergency, such as a smoke generating event. Examples of operator stations are a submarine control station, a nuclear power plant control room, an oil rig or any other critical or military environments where the need exists for an operator to continue to operate in case of a vision-obscuring emergency, such as when smoke or other particulate matter invades the operator station and obliterates the visibility between the operator and the control panel. Accordingly, where the instruments, control panel or critical sources of information are disposed in an operator station, the operator must have visual access to the information in case a vision-obscuring event occurs in the operator station.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A glare shield equipped with an emergency vision apparatus, comprising:
   a) a glare shield in a cockpit;
   b) a compartment recessed into said glare shield;
   c) a blower within said compartment;
   d) an inflatable first enclosure made of airtight material and having an expanded form when deployed and a deflated form when not in use, said first enclosure when in said deflated form is stored within said compartment;
   e) first and second clear members disposed at respective first and second ends of said first enclosure to enable a user to see through said first enclosure when expanded and observe a source of information at a distal end of said first enclosure while smoke or other particulate matter is in the environment;
   f) a switch operably associated with said blower to activate said blower and thereby inflate said first enclosure to said expanded form when said first enclosure is to be deployed;
   g) a tubular air passageway connecting said blower and said first enclosure;
   h) said compartment including a removable cover; and
   i) said switch is operably connected to said cover such that when said cover is removed, said switch is automatically activated.

2. A glare shield quipped with an emergency vision apparatus, as in claim 1, wherein said compartment includes a first section for housing said blower and a second section for housing said inflatable first enclosure when in said deflated form.

3. A glare shield equipped with an emergency vision apparatus, as in claim 2, wherein:
   a) said compartment includes a partition between said first section and said second section; and
   b) said removable cover is disposed over said first section.

4. A glare shield equipped with an emergency vision apparatus, as in claim 1, wherein:
   a) a removable member is operably associated with said switch and configured to activate said switch to an ON state when said member is removed from said switch; and
   b) said member is attached to said cover such that removal of said cover is effective to remove said member from said switch.

5. A glare shield equipped with an emergency vision apparatus, as in claim 1, wherein said inflatable first enclosure when in said expanded form is disposed over said compartment.

6. A glare shield equipped with an emergency vision apparatus, as in claim 1, wherein said tubular air passageway adopts a shorter length when in storage and a longer length when deployed.

7. A glare shield equipped with an emergency vision apparatus, as in claim 1, wherein said tubular air passageway is extendable in length when deployed.

8. A glare shield equipped with an emergency vision apparatus, as in claim 1, wherein said inflatable first enclosure includes a connector for connecting another tubular air passageway to another inflatable enclosure.

9. A glare shield equipped with an emergency vision apparatus, as in claim 1, wherein said first enclosure includes a tube connector and further comprising:
   a) a hand held inflatable second enclosure; and b) a flexible tube having one end connected to said tube connector and another end connected to said hand held inflatable second enclosure such that a portion of inflating air from said inflatable first enclosure is used to inflate said hand held inflatable second enclosure.

10. An instrument panel equipped with an emergency vision apparatus, comprising:
   a) an instrument panel;
   b) a compartment recessed into said instrument panel;
   c) a blower within said compartment;
   d) an inflatable first enclosure made of airtight material and having an expanded form when deployed and a deflated form when not in use, said first enclosure when in said deflated form is stored within said compartment;
   e) first and second clear members disposed at respective first and second ends of said enclosure to enable a user to see through said first enclosure when expanded and observe a source of information at a distal end of said first enclosure while smoke or other particulate matter is in the environment;
   f) a switch operably connected to said blower to activate said blower and thereby inflate said first enclosure to said expanded form when said first enclosure is to be deployed;
   g) a tubular air passageway connecting said blower and said first enclosure;
   h) said compartment including a removable cover; and
   i) said switch is operably connected to said cover such that when said cover is removed, said switch is automatically activated.

11. A glare shield equipped with an emergency vision apparatus, comprising:
   a) a glare shield in a cockpit;
   b) a compartment recessed into said glare shield;
   c) a blower within said compartment;
   d) an inflatable first enclosure made of airtight material and having an expanded form when deployed and a deflated form when not in use, said first enclosure when in said deflated form is stored outside said compartment;
   e) first and second clear members disposed at respective first and second ends of said first enclosure to enable a user to see through said first enclosure when expanded and observe a source of information at a distal end of said first enclosure while smoke or other particulate matter is in the environment;
   f) a tubular air passageway including a first end connected to said blower and a second end terminated outside of said compartment, said second end for connecting to said first enclosure; and
   g) a removable cap disposed on said second end; and
   h) a switch operably connected to said blower to activate said blower and thereby inflate said first enclosure to said expanded form when said first enclosure is to be deployed.

12. A glare shield equipped with an emergency vision apparatus, as in claim 11, and further comprising another tubular passageway having one end connected to said blower and another end terminating at a location on said glare shield.

13. A glare shield equipped with an emergency vision apparatus, as in claim 11, and further comprising another tubular passageway having one end connected to said blower and another end terminating at a location remote from said compartment.

14. A glare shield equipped with an emergency vision apparatus, as in claim 11, wherein said switch is a proximity switch operably associated with said cap such that removal of said cap is effective to activate said switch.

15. A glare shield equipped with an emergency vision apparatus, as in claim 11, and further comprising another tubular passageway having one end connected to said blower and another end terminating at a location remote from said compartment.

16. A glare shield equipped with an emergency vision apparatus, as in claim 15, and further comprising:
   a) another removable cap disposed on said another end; and
   b) said switch is operably associated with said another removable cap to activate said blower when said another removable cap is removed.

17. A glare shield equipped with an emergency vision apparatus, as in claim 11, wherein said cap is operably associated with said switch such that removal of said cap automatically activates said blower.

18. A glare shield equipped with an emergency vision apparatus, as in claim 17, wherein:
   a) a removable member is operably associated with said switch and configured to activate said switch to an ON state when said member is removed from said switch; and
   b) said member is attached to said cap such that removal of said cap is effective to remove said member from said switch.

19. An instrument panel equipped with an emergency vision apparatus, comprising:
   a) an instrument panel;
   b) a compartment recessed into said instrument panel;
   c) a blower within said compartment;
   d) an inflatable first enclosure made of airtight material and having an expanded form when deployed and a deflated form when not in use, said first enclosure when in said deflated form is stored outside said compartment within a pouch;
   e) first and second clear members disposed at respective first and second ends of said first enclosure to enable a user to see through said first enclosure when expanded and observe a source of information at a distal end of said first enclosure while smoke or other particulate matter is in the environment;
   f) a tubular air passageway including a first end connected to said blower and a second end terminated outside of said compartment, said second end for connecting to said first enclosure;
   g) a removable cap disposed on said second end; and
   h) a switch operably connected to said cap to activate said blower when said cap is removed and thereby inflate said first enclosure when connected to said second end.

* * * * *